(12) United States Patent
Xue et al.

(10) Patent No.: US 11,522,546 B2
(45) Date of Patent: Dec. 6, 2022

(54) CLOCK TREE, HASH ENGINE, COMPUTING CHIP, HASH BOARD AND DATA PROCESSING DEVICE

(71) Applicant: SHENZHEN MICROBT ELECTRONICS TECHNOLOGY CO., LTD., Guangdong (CN)

(72) Inventors: Ke Xue, Guangdong (CN); Zhijun Fan, Guangdong (CN); Chao Xu, Guangdong (CN); Zuoxing Yang, Guangdong (CN)

(73) Assignee: SHENZHEN MICROBT ELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/627,028

(22) PCT Filed: Jun. 16, 2021

(86) PCT No.: PCT/CN2021/100256
§ 371 (c)(1),
(2) Date: Jan. 13, 2022

(87) PCT Pub. No.: WO2022/012252
PCT Pub. Date: Jan. 20, 2022

(65) Prior Publication Data
US 2022/0271753 A1    Aug. 25, 2022

(30) Foreign Application Priority Data
Jul. 16, 2020    (CN) .......................... 202010687806.8

(51) Int. Cl.
*H03K 19/17736*    (2020.01)
*H04L 9/06*    (2006.01)
(Continued)

(52) U.S. Cl.
CPC ....... *H03K 19/1774* (2013.01); *G06F 9/3012* (2013.01); *G06F 15/7817* (2013.01); *H03K 19/17744* (2013.01); *H04L 9/0643* (2013.01)

(58) Field of Classification Search
None
See application file for complete search history.

(56) References Cited

U.S. PATENT DOCUMENTS

2012/0159416 A1    6/2012  Jiang et al.
2017/0061057 A1*   3/2017  Lee .......................... G06F 30/39
(Continued)

FOREIGN PATENT DOCUMENTS

CN    102195638 A    9/2011
CN    102567557 A    7/2012
(Continued)

OTHER PUBLICATIONS

International Search Report and Written Opinion dated Sep. 15, 2021 in International Application PCT/CN2021/100256.
Office Action dated Apr. 24, 2022 in Taiwanese Patent Application No. 110121846.

*Primary Examiner* — Jany Richardson
(74) *Attorney, Agent, or Firm* — Venable LLP

(57) ABSTRACT

This disclosure relates to a device performing hash algorithm. A hash engine includes an operation module performing a hash operation on a data block and a clock module. The operation module includes operation stages each including registers and a combinational logic module. A digital signal based on the data block is sequentially delivered along the operation stages. Outputs of a first set of registers are coupled to an input of the combinational logic module of the current operation stage. Inputs of a second set of registers are coupled to an output of a combinational logic module of a previous operation stage. A clock signal, provided by the clock module to each operation stage, is sequentially deliv- (Continued)

ered along a multi-stage clock driving circuits of the clock module. For the first and second sets of registers, a delivery direction of the digital signal is the same as that of the clock signal.

15 Claims, 8 Drawing Sheets

(51) Int. Cl.
*G06F 15/78* (2006.01)
*G06F 9/30* (2018.01)

(56) References Cited

U.S. PATENT DOCUMENTS

| | | | |
|---|---|---|---|
| 2017/0302440 | A1 | 10/2017 | Agrawal et al. |
| 2018/0004242 | A1* | 1/2018 | Suresh ................ G09C 1/00 |
| 2022/0077865 | A1* | 3/2022 | Li ................ H03M 1/0624 |

FOREIGN PATENT DOCUMENTS

| | | |
|---|---|---|
| CN | 105306068 A | 2/2016 |
| CN | 108427575 A | 8/2018 |
| CN | 110633104 A | 12/2019 |
| CN | 110825210 A | 2/2020 |
| CN | 111061335 A | 4/2020 |
| CN | 111651402 A | 9/2020 |

* cited by examiner

CLOCK TREE, HASH ENGINE, COMPUTING CHIP, HASH BOARD AND DATA PROCESSING DEVICE

CROSS-REFERENCE TO RELATED APPLICATIONS

The present application is a National Stage Entry of International Application No. PCT/CN2021/100256 filed Jun. 16, 2021, entitled "CLOCK TREE, HASH ENGINE, COMPUTING CHIP, HASH BOARD AND DATA PROCESSING DEVICE", which claims priority to Chinese Patent Application No. 202010687806.8 filed Jul. 16, 2020, entitled "CLOCK TREE, HASH ENGINE, COMPUTING CHIP, HASH BOARD, AND DIGITAL CURRENCY MINING MACHINE", the contents of which are hereby incorporated by reference in their entireties.

TECHNICAL FIELD

The present disclosure relates to a device for performing a hash algorithm, including a clock tree circuit, a hash engine, a computing chip, a hash board, and a data processing device.

BACKGROUND

A Bitcoin system is a blockchain system which is first proposed and most widely recognized at present. One of primary roles of the Bitcoin system is to act as a decentralized public ledger, which can record a variety of financial transactions. This is called "decentralization" because Bitcoin is not issued by a single centralized monetary institution, but is generated through computations according to a specific algorithm. The Bitcoin system uses a distributed database composed of nodes of a computer network to validate and record all transactions and uses cryptographic design to ensure their security.

At present, the Bitcoin protocol employs a secure hash algorithm (SHA)-256. The series of SHA algorithms are issued by US institute of standards and technology, wherein the SHA-256 is a secure hash algorithm with a hash length of 256 bits.

According to the Bitcoin protocol, a node that firstly succeeds in determining a proof of work (POW) of a candidate block has the right to add the block to a blockchain and to generate a new cryptocurrency unit as a reward. This process is known as "mining" and a node for performing the Bitcoin algorithm, i.e., a data processing device, is known as a mining machine or miner.

If an application specific integrated circuit (ASIC) is employed to perform the mining process, i.e., an ASIC chip is employed to perform the SHA-256 algorithm, a key to the design goal is to improve dimensions, running speed, and power consumption of the chip. The dimensions of the chip determine its cost, the running speed of the chip determines the miner's running speed, i.e., hash rate, and the power consumption of the chip determines consumed electricity, i.e., mining cost. In practical applications, a most important performance index for measuring the miner is power consumed by unit hash rate, i.e., a power-consumption-to-hash-rate ratio. Therefore, it is most important for the Bitcoin miner to implement the SHA-256 algorithm with a lower power-consumption-to-hash-rate ratio.

Therefore, there is a need for a circuit for implementing the hash algorithm with a lower power-consumption-to-hash-rate ratio.

SUMMARY

According to a first aspect of the present disclosure, there is provided a hash engine, comprising: an input module, configured to receive a data block; an operation module, configured to perform a hash operation on the received data block, the operation module comprising a plurality of operation stages arranged in a pipeline structure such that a digital signal based on the data block is sequentially delivered along the plurality of operation stages, each operation stage among the plurality of operation stages comprising a plurality of registers and a combinational logic module, wherein in each current operation stage, output ends of a first set of registers among the plurality of registers are at least coupled to an input end of the combinational logic module of the current operation stage, and input ends of a second set of registers among the plurality of registers are coupled to an output end of a combinational logic module of a previous operation stage; and a clock module, configured to provide a clock signal to each of the plurality of operation stages, the clock module comprising multi-stage clock driving circuits such that the clock signal from a clock source is sequentially delivered along the multi-stage clock driving circuits, wherein for the first and second sets of registers of the plurality of operation stages, a delivery direction of the digital signal is the same as that of the clock signal.

Further, in each current operation stage, a third set of registers among the plurality of registers has their input ends coupled to output ends of corresponding registers in the previous operation stage, and their output ends coupled to input ends of corresponding registers in a next operation stage, wherein for the third set of registers of the plurality of operation stages, a delivery direction of the digital signal is opposite to that of the clock signal.

The hash engine according to the present disclosure can be used to perform a SHA-256 algorithm.

According to a second aspect of the present disclosure, there is provided a clock tree circuit, comprising: a clock source, configured to provide a basic clock signal; and multi-stage clock driving circuits, wherein the basic clock signal from the clock source is sequentially delivered along the multi-stage clock driving circuits, each stage clock driving circuit among the multi-stage clock driving circuits being configured to provide a clock signal for each of a plurality of operation stages, wherein the plurality of operation stages are arranged in a pipeline structure such that a digital signal based on a received data block is sequentially delivered along the plurality of operation stages, each operation stage among the plurality of operation stages comprising a plurality of registers and a combinational logic module, wherein in each current operation stage, a first set of registers among the plurality of registers has their output ends at least coupled to an input end of the combinational logic block of the current operation stage, a second set of registers among the plurality of registers has their input ends coupled to an output end of a combinational logic block of a previous operation stage, and a third set of registers among the plurality of registers has their input ends coupled to output ends of corresponding registers in a previous operation stage, and their output ends coupled to input ends of corresponding registers in a next operation stage, wherein for the first and second sets of registers of each of the plurality of operation stages, a delivery direction of the digital signal is the same as that of the clock signal, and wherein for the third set of registers of the plurality of operation stages, the delivery direction of the digital signal is opposite to that of the clock signal.

According to a third aspect of the present disclosure, there is provided a computing chip comprising one or more hash engines as described above.

According to a fourth aspect of the present disclosure, there is provided a hash board comprising one or more computing chips as described above.

According to a fifth aspect of the present disclosure, there is provided a data processing device comprising one or more hash boards as described above.

Other features and advantages of the present disclosure will become clear from the following description with reference to the accompanying drawings.

BRIEF DESCRIPTION OF THE DRAWINGS

The included drawings are for illustrative purposes and serve only to provide examples of possible structures and arrangements of an inventive apparatus disclosed herein and a method of applying it to a computing device. These drawings in no way limit any change in form and details that may be made to embodiments by those skilled in the art without departing from the essence and scope of the embodiments. The embodiments will be more readily understood by the following detailed description in conjunction with the accompanying drawings, wherein similar reference numerals denote similar structural elements.

Figure 1:
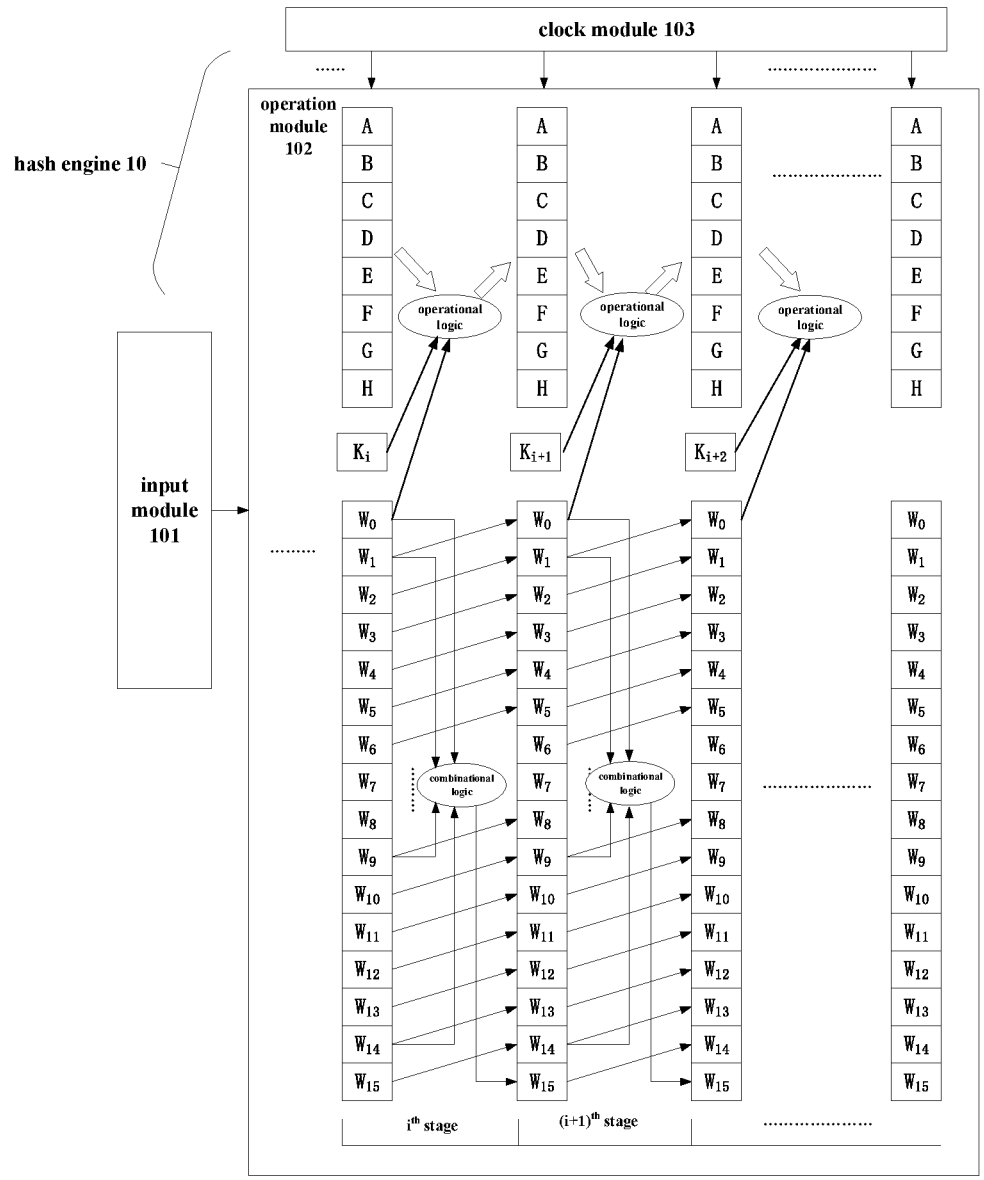
FIG. 1 is a diagram of a SHA-256 hash engine according to an embodiment of the present disclosure.

Note that in the embodiments described below, a same reference numeral is shared among different drawings to denote same portions or portions having a same function, and repetitive description thereof will be omitted. In this specification, similar reference numerals and letters are used to denote similar items, and therefore, once a certain item is defined in one drawing, further discussion thereof is not required in subsequent drawings.

For ease of understanding, positions, dimensions, ranges, etc. of structures shown in the drawings and the like sometimes do not necessarily represent their actual positions, dimensions, ranges, etc. Therefore, the disclosed disclosure is not limited to the positions, dimensions, ranges, etc. disclosed in the drawings and the like. Further, the drawings are not necessarily drawn to scale, and some features may be enlarged to show details of specific components.

DETAILED DESCRIPTION

Various exemplary embodiments of the present disclosure will now be described in detail with reference to the accompanying drawings. It should be noted that relative arrangements of components and steps, numerical expressions, and numerical values set forth in these embodiments do not limit the scope of the present disclosure unless otherwise specified.

The following description of at least one exemplary embodiment is merely illustrative in nature and is in no way intended to limit this disclosure, its applications, or uses. That is, a hash engine herein is shown in an exemplary way to illustrate different embodiments of a circuit in the present disclosure and is not intended to be limiting. Those skilled in the art will appreciate that they are merely illustrative of exemplary ways in which the present disclosure can be practiced, rather than exhaustive ways.

A technique, method, and device known to one of ordinary skill in the related art may not be discussed in detail, but the technique, method, and device should be regarded as part of the granted specification where appropriate.

The present disclosure provides a novel clock tree solution that can be used in any cryptographic algorithm circuit with a pipeline architecture. For ease of description, a SHA-256 hash algorithm circuit is taken as an example for the following explanation. It will be appreciated by those skilled in the art that the SHA-256 is only one example in which the clock tree solution of the present disclosure can be applied, and that the present disclosure can also be applied in another cryptographic algorithm circuit having the pipeline structure.

Reference is now made to FIG. 1, which is a diagram of a SHA-256 hash engine according to an embodiment of the present disclosure. Those skilled in the art will appreciate that the following description of the SHA-256 is provided for the purpose of more clearly presenting inventive concepts of the present application and is not intended to be in any way limiting. The SHA-256 mentioned herein includes any known version of SHA-256 and variations and modifications thereof.

As shown in FIG. 1, the hash engine 10 may comprise an input module 101, an operation module 102, and a clock module 103. The input module 101 is configured to receive a data block. The operation module 102 can perform a SHA-256 hash operation on the received data block. The clock module 103 is configured to provide a required clock signal for the operation module 102.

As shown in FIG. 1, the operation module 102 may comprise a plurality of operation stages, a $1^{st}$ stage ... $i^{th}$ stage ... $N^{th}$ stage, arranged in a pipeline structure. N can be 32, 64, 128, etc. Each operation stage can comprise registers A to H and their corresponding operational logic, registers $W_0$ to $W_{15}$ and their corresponding combinational logic, and a memory for storing a constant K. The registers $W_0$ to $W_{15}$ are commonly referred to as extension registers because they are configured to extend the input data block. The registers A to H are commonly referred to as compression registers because they are configured to compress extended data into a hash value.

As shown in FIG. 1, in the registers $W_0$ to $W_{15}$, outputs of the registers $W_1$ to $W_{15}$ of each stage are provided as inputs to registers $W_0$ to $W_{14}$ at a next stage, while outputs of the registers $W_0$, $W_1$, $W_9$, $W_{14}$ are provided as inputs to a combinational logic, an output of which is provided as an input to a register $W_{15}$ of the next stage. That is, the registers $W_0$, $W_1$, $W_9$, $W_{14}$ and $W_{15}$ of each stage are related to a combinational logical operation of a previous or current stage, and the remaining registers are not related to the combinational logical operation of the previous or current stage.

The clock module 103 can provide a clock signal to the operation module 102, and specifically, to each register in the operation module 102. Typically, the clock signal output by the clock module 103 is derived from a single clock source. However, in such a chip like SHA-256, there are a large number of time sequential devices such as registers. If the time sequential devices are directly driven by using a single clock source signal, the load driving capacity will become a problem, and excessively long wiring from the clock source to clock ends of the registers results in excessively great latency. Therefore, a clock tree architecture is usually employed to provide the clock signal, i.e. inserting a buffer or an inverter between the clock source and the time sequential devices to form a clock distribution network. In a pipeline architecture, there are two clock tree structures, namely, a forward clock tree and a reverse clock tree.

Figure 2A:
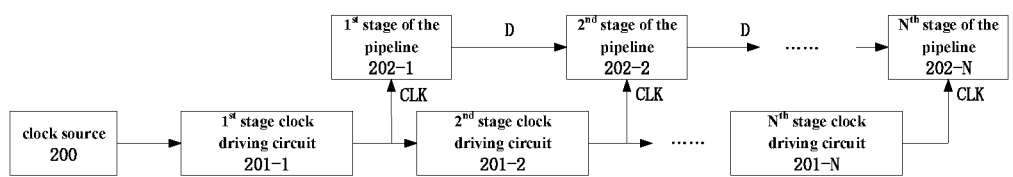
FIG. 2A is a diagram illustrating driving registers by a forward clock tree in a pipeline architecture.

FIG. 2A is a diagram illustrating driving registers by a forward clock tree in a pipeline architecture. As shown, pipeline operation stages 202-1 . . . 202-N are driven by a clock tree composed of a clock source 200 and multi-stage clock driving circuits 201-1 . . . 201-N. Since a delivery direction (from left to right) of the clock signal is consistent with a data delivery direction (from left to right) of the pipeline, this clock tree is called the forward clock tree.

Figure 2B:
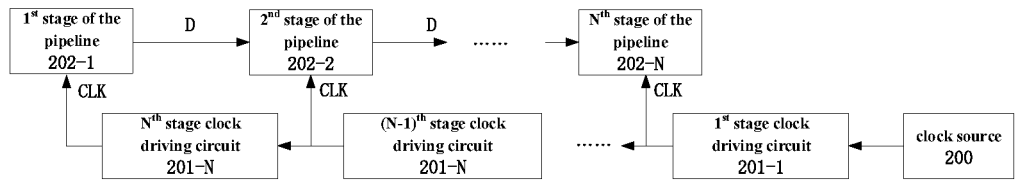
FIG. 2B is a diagram illustrating driving registers by a reverse clock tree in a pipeline architecture.

FIG. 2B is a diagram illustrating driving registers by a reverse clock tree in a pipeline architecture. As shown, pipeline operation stages 202-N . . . 202-1 are driven by a clock tree composed of a clock source 200 and multi-stage clock driving circuits 201-1 . . . 201-N. Since a delivery direction (from right to left) of the clock signal is opposite to a data delivery direction (from left to right) of the pipeline, this clock tree is called the reverse clock tree.

Figure 3A:
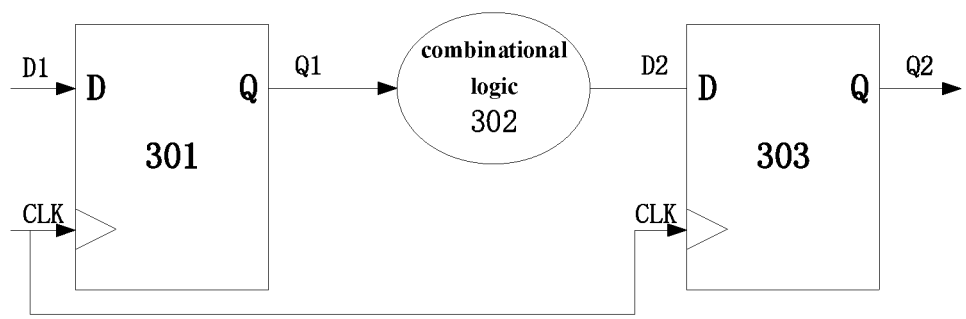
FIGS. 3A and 3B are diagrams illustrating setup time and hold time of a register.
Figure 3B:
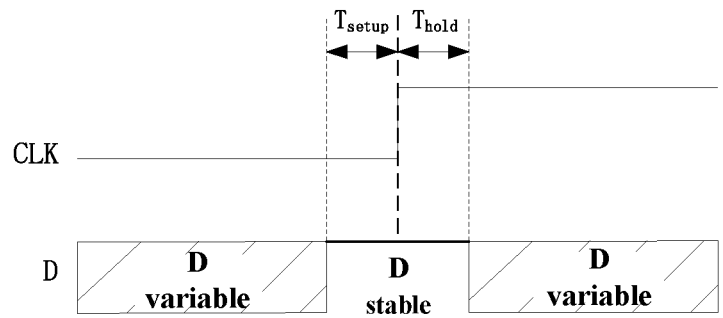

Regardless of which clock tree structure is employed, requirements for setup time and hold time of the register should be met. FIGS. 3A and 3B are diagrams illustrating setup time and hold time of a register. The setup time $T_{setup}$ refers to a time during which data must remain stable before a clock edge arrives. If the setup time does not meet the requirement, the data cannot be stably fed into the register at this clock edge. The hold time $T_{hold}$ refers to a time during which the data must remain stable after the clock edge arrives. If the hold time does not meet the requirement, the data likewise cannot be stably fed into the register.

Here, this will be described in detail through a common circuit in digital circuit design. As shown in FIG. 3A, the circuit comprises flip-flops 301 and 303 and combinational logic 302. A data signal Q1 output by the flip-flop 301 is transferred to an input of the flip-flop 303 via the combinational logic 302, and a clock signal CLK controls the flip-flop 303 to capture the data signal. In order to make the data signal be properly captured by the flip-flop 303, the data signal should reach the input of the flip-flop 303 at a time of at least $T_{setup}$ before the clock edge and hold for at least $T_{hold}$ after the clock edge.

On the basis that $T_{setup}$ and $T_{hold}$ are met, a transmission latency range of an intermediate combinational logic circuit can be determined. Assume that a clock cycle is $T_{clk}$, an output latency of the flip-flop is $T_{co}$, and the latency of the combinational logic is $T_{comb}$.

For $T_{setup}$, it must meet:

$$T_{clk} - T_{co} - T_{comb} > T_{setup} \quad \text{(Equation 1)}$$

Considering a worst case, i.e., greatest output latency of the flip-flop and greatest latency of the combinational logic circuit, the above Equation 1 becomes:

$$T_{clk} - T_{co-max} - T_{comb-max} > T_{setup} \quad \text{(Equation 2)}$$

For $T_{hold}$, it must meet:

$$T_{co} + T_{comb} > T_{hold} \quad \text{(Equation 3)}$$

Considering a worst case, i.e., least output latency of the flip-flop and least latency of the combinational logic circuit, the above Equation 3 becomes $$T_{co-min} + T_{comb-min} > T_{hold} \quad \text{(Equation 4)}$$

In conjunction with the forward clock tree and the reverse clock tree of FIGS. 2A and 2B, assuming that the latency of the clock driving circuit of each stage is $T_{clklatency}$, the above Equations 2 and 4 respectively become the following Equations.

For the forward clock tree:
considering $T_{setup}$:

$$T_{clk} + T_{clklatency} - T_{co-max} - T_{comb-max} > T_{setup} \quad \text{(Equation 5)}$$

that is, $$T_{clk} > T_{setup} + T_{co-max} + T_{comb-max} - T_{clklatency} \quad \text{(Equation 6)}$$

Considering $T_{hold}$:

$$T_{co-min} + T_{comb-min} > T_{hold} + T_{clklatency} \quad \text{(Equation 7)}$$

that is, $$T_{co-min} + T_{comb-min} - T_{clklatency} > T_{hold} \quad \text{(Equation 8)}$$

For the reverse clock tree:
considering $T_{setup}$:

$$T_{clk} - T_{clklatency} - T_{co-max} - T_{comb-max} > T_{setup} \quad \text{(Equation 9)}$$

that is, $$T_{clk} > T_{setup} + T_{co-max} + T_{comb-max} + T_{clklatency} \quad \text{(Equation 10)}$$

Considering $T_{hold}$:

$$T_{co-min} + T_{comb-min} > T_{hold} - T_{clklatency} \quad \text{(Equation 11)}$$

that is, $$T_{co-min} + T_{comb-min} + T_{clklatency} > T_{hold} \quad \text{(Equation 12)}$$

Comparing the Equations 6 and 10, it can be seen that $T_{clk}$ of the forward clock tree can be less, i.e., the period can be less, and accordingly frequency of the chip can be faster, so as to achieve higher performance. However, $T_{clk}$ of the reverse clock tree needs to be greater, i.e., the period needs to be greater, so the frequency of the chip becomes slower and the performance thereof is degraded.

However, comparing the Equations 8 and 12, it can be seen that the hold time of the flip-flop is less easily met when the forward clock tree is employed, and is more easily met when the reverse clock tree is employed. Especially if the latency of the combinational logic between two flip-flops is very little or there is even no combinational logic, i.e. $T_{comb-min}$ is 0, the hold time of the forward clock tree will be difficult to be met.

The synchronous time sequential circuit works normally on the premise that the setup time and the hold time of the flip-flop are both met. The hold time is a more important index and must be met. If the hold time is not met, the chip cannot work normally. Therefore, in the prior art, the reverse clock tree is typically employed to ensure that the requirement for the hold time $T_{hold}$ is met. But this will sacrifice the frequency of the chip, resulting in the degraded performance of the chip.

The present disclosure provides a novel clock tree solution that can increase the running frequency of the chip while meeting the requirement for the hold time $T_{hold}$, thereby improving the chip performance.

Figure 4:
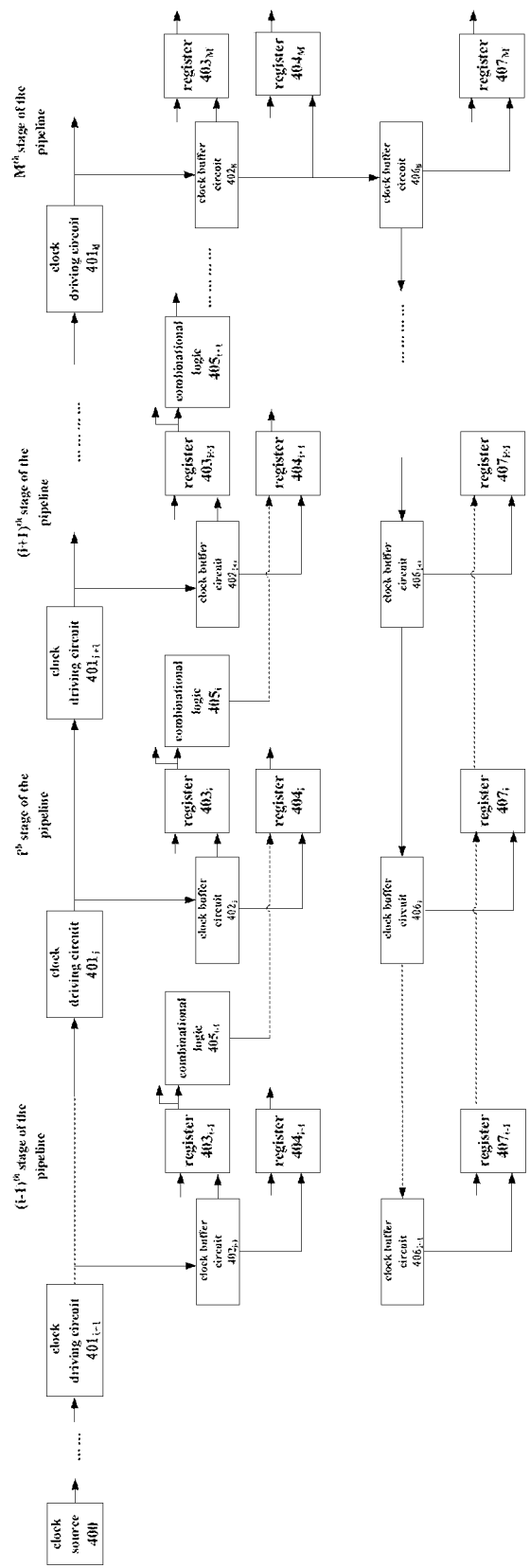
FIG. 4 is a schematic diagram illustrating a clock tree structure according to an embodiment of the present disclosure.

FIG. 4 is a schematic diagram illustrating a clock tree structure according to an embodiment of the present disclosure. As shown in FIG. 4, the clock tree may comprise a clock source 400, multi-stage clock driving circuits $401_1 \ldots 401_M \ldots$, a first set of clock buffer circuits $402_1 \ldots 402_M \ldots$, and a second set of clock buffer circuits $406_1 \ldots 406_M \ldots$. An $i^{th}$ stage clock driving circuit is used for providing a clock for an $i^{th}$ operation stage of a pipeline. Here, i and M are less than a total stage number N of the pipeline.

Here, the $i^{th}$ operation stage is taken as an example for explanation. As shown in FIG. 4, the $i^{th}$ operation stage of an operation module comprises a first-class register $403_i$, a second-class register $404_i$, and a third-class register $407_i$. An output end of the first-class register $403_i$ is connected to an input end of a combinational logic $405_i$ of the $i^{th}$ operation stage in addition to an input end of a corresponding register of an $(i+1)^{th}$ operation stage, that is, the output of the first-class register $403_i$ needs to participate in an combinational logic operation. An input end of the second-class register $404_i$ is connected to an output end of a combinational logic $405_{i-1}$ of an $(i-1)^{th}$ operation stage, that is, the input of the second-class register $404_i$ receives the output from the combinational logic of the $(i-1)^{th}$ operation stage. Both the first-class register $403_i$ and the second-class register $404_i$ are associated with the combinational logical operation. However, the third-class register $407_i$ receives output from a corresponding register of the $(i-1)^{th}$ operation stage and provide its own output to the corresponding register of the $(i+1)^{th}$ operation stage, that is, the third-class register $407_i$ is independent of the combinational logical operation of the $(i-1)^{th}$ operation stage or the $i^{th}$ operation stage.

It should be noted that for simplicity of description, only one register is shown here for each class of registers. It will be appreciated by those skilled in the art that the number of registers of each class is not limited to one, but can be any number according to an actual circuit structure. Taking the SHA-256 circuit shown in FIG. 1 as an example, the first-class register $403_i$ can include $W_0$, $W_1$, $W_9$, and $W_{14}$, the second-class register $404_i$ can include $W_{15}$, and the third-class register $407_i$ can include $W_2$ to $W_8$ and $W_{10}$ to $W_{13}$. It should be noted that such classification of the registers of the SHA-256 circuit is merely an example, and those skilled in the art can make classification in different ways according to an actual situation, as will be described below.

As shown in FIG. 4, according to the embodiment of the present disclosure, for the first-class register $403_i$ and the second-class register $404_i$ related to the combinational logical operation, the forward clock tree structure is employed, i.e., clock ends of the first-class register $403_i$ and the second-class register $404_i$ of the $i^{th}$ operation stage are coupled to output ends of the clock buffer circuit $402_i$, and an input end of the clock buffer circuit $402_i$ is coupled to an output end of the clock driving circuit $401_i$.

For the third-class register $407_i$, which is independent of the combinational logical operation of the $(i-1)^{th}$ or $i^{th}$ operation stage, the reverse clock tree structure is employed, i.e. a clock end of the third-class registers $407_i$ of the $i^{th}$ operation stage is coupled to an output end of the clock buffer circuit $406_i$, and an input end of the clock buffer circuit $406_i$ is coupled to an output end of a corresponding clock buffer circuit $406_{i+1}$ of the $(i+1)^{th}$ operation stage. The output end of the corresponding clock buffer circuit $406_{i+1}$ is also coupled to a clock end of a corresponding register $407_{i+1}$ of the $(i+1)^{th}$ operation stage. The corresponding register $407_{i+1}$ refers to the register $407_{i+1}$ of the $(i+1)^{th}$ operation stage, to which an output end of the register $407_i$ of the $i^{th}$ operation stage is connected. Taking the SHA-256 as an example, for example, an output end of the register $W_5$ of the $i^{th}$ operation stage is connected to a register $W_4$ of the $(i+1)^{th}$ operation stage, so that the clock end of the register $W_5$ of the $i^{th}$ operation stage is coupled to the output end of its corresponding clock buffer circuit $406_i$, and the input end of the clock buffer circuit $406_i$ is coupled to the output end of the clock buffer circuit $406_{i+1}$ of the $(i+1)^{th}$ operation stage used for providing the clock signal to the register $W_4$.

That is, for the third-class register, an input end of a clock buffer circuit providing the clock signal to a register $W_k$ of the $i^{th}$ operation stage is coupled to an output end of a clock buffer circuit of the $(i+1)^{th}$ operation stage used for providing the clock signal to a register $W_{k-1}$, and so on, until an $M^{th}$ operation stage, at which an input end of a clock buffer circuit $406_M$ providing the clock signal to a third-class register $407_M$ is coupled to an output end of a clock buffer circuit $402_M$ of the $M^{th}$ operation stage used for providing the clock signal to a first-class register $403_M$ and a second-class register $404_M$. Taking the SHA-256 circuit shown in FIG. 1 as an example, an input end of a clock buffer circuit providing the clock signal to a register $W_2$ of the $(M-1)^{th}$ operation stage should be coupled to an output end of a clock buffer circuit of the $M^{th}$ operation stage used for providing the clock signal to a register $W_1$ and $W_1$ belongs to the first-class register, i.e., an input end of the clock buffer circuit of the $M^{th}$ operation stage used for providing the clock signal to the register $W_1$ is coupled to an output end of the clock driving circuit $401_M$, so that at the $M^{th}$ operation stage, output of the clock buffer circuit $402_M$ providing the clock signal to the register $W_1$ is, after passing through the clock buffer circuit $406_M$ again, input to the clock buffer circuit of the $(M-1)^{th}$ operation stage used for providing the clock signal to the register $W_2$.

According to the above Equations 8 and 12, since the first-class register $403_i$ and the second-class register $404_i$ participate in the combinational logical operation, $T_{comb-min}$ is not 0 and often has greater latency relative to the clock signal, $T_{hold}$ can also be met even if the forward clock tree is employed. Meanwhile, the third-class register $407_i$ that does not participate in the combinational logical operation can also meet $T_{hold}$ because it employs the inverse clock tree. At the same time, the clock module overall employs the forward clock tree structure, so that the running frequency of the chip can be improved, and thus, the chip performance is improved.

An application example of the above inventive concept of the present disclosure will be described below in conjunction with the circuit structure of the SHA-256.

Figure 5:
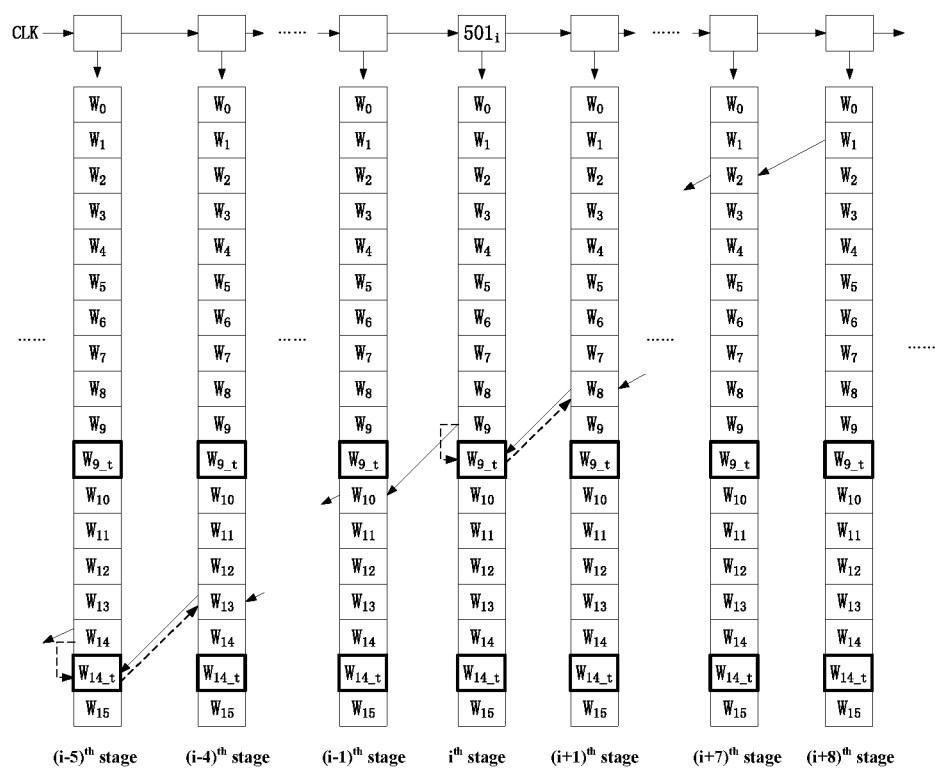
FIG. 5 is a diagram illustrating a hash engine employing the clock tree structure of FIG. 4 according to an embodiment of the present disclosure.

FIG. 5 is a diagram illustrating a hash engine employing the clock tree structure of FIG. 4 according to an embodiment of the present disclosure. A solid arrow in FIG. 5 indicates a delivery direction of the clock signal, and a dotted arrow indicates a delivery direction of the data. Note that unnecessary illustrations and descriptions are omitted here to avoid obscuring the subject matter. For example, the hash engine of FIG. 5 omits compression registers A to H, and only extension registers $W_0$ to $W_{15}$ are shown. Further, for simplicity, FIG. 5 shows only data delivery and clock delivery of some of registers in each operation stage, and data delivery and clock delivery of other registers are omitted. Data delivery and clock delivery of registers in operation stages are readily contemplated by those skilled in the art in light of the teachings of the present disclosure.

As shown in FIG. 5, the hash engine may comprise a plurality of operation stages, each of which comprises a plurality of registers $W_0$ to $W_{15}$ and is driven by a corresponding clock driving circuit 501. According to the embodiment shown in FIG. 5, the hash engine overall employs the forward clock tree structure, and locally employs the reverse clock tree structure. As described above, clocks of the registers $W_0$, $W_1$, $W_9$, $W_{14}$ and $W_{15}$ of each operation stage are coupled to a main clock tree, and a clock of a remaining registers $W_k$ ($W_2$ to $W_8$ and $W_{10}$ to $W_{13}$) are passed from a clock of a register $W_{k-1}$ of a next operation stage. FIG. 5 omits clock buffer circuits for ease of explanation, and a delivery path of a clock signal of a register is only indicated by the solid arrow. It will be appreciated by those skilled in the art in light of the teachings of the present disclosure that a clock end of each register is coupled to an output end of a corresponding clock buffer circuit.

For the register $W_9$ of each operation stage, it participates in the combinational logical operation, and thus receives the clock signal from the forward clock tree. At the same time, the data of the register $W_9$ also needs to be transferred to a register $W_8$ of a next operation stage, thus the clock signal of the register $W_8$ of the next operation stage needs to be transferred to the register $W_9$ of the current operation stage to meet the requirement for the reverse clock tree. The register $W_{14}$ is similar.

To this end, in the embodiment of FIG. 5, each operation stage comprises a seventeenth register $W_{9\_t}$ and an eighteenth register $W_{14\_t}$ in addition to first to sixteenth registers $W_0$ to $W_{15}$.

The seventeenth register $W_{9\_t}$ has its input end coupled to an output end of the tenth register $W_9$, its output end coupled to an input end of a ninth register $W_8$ of the next operation stage, and its clock signal end coupled to an output end of a clock buffer circuit for the seventeenth register. An input end of the clock buffer circuit for the seventeenth register $W_{9\_t}$ is coupled to an output end of a clock buffer circuit for a ninth register $W_8$ of the next operation stage. That is, the clock of the seventeenth register $W_{9\_t}$ is transferred from the clock of the $W_8$ of the next operation stage.

The eighteenth register $W_{14\_t}$ has its input end coupled to an output end of the fifteenth register $W_{14}$, its output end coupled to an input end of a fourteenth register $W_{13}$ of the next operation stage, and its clock signal end coupled to an output end of a clock buffer circuit for the eighteenth register. An input end of the clock buffer circuit for the eighteenth register $W_{14\_t}$ is coupled to an output end of a clock buffer circuit for a fourteenth register $W_{13}$ of the next operation stage. That is, the clock of the register $W_{14\_t}$ is transferred from the clock of the register $W_{13}$ of the next operation stage.

From the perspective of the overall pipeline, the clocks of the registers $W_0$, $W_1$, $W_9$, $W_{14}$, $W_{15}$ of the $i^{th}$ operation stage are coupled to the master clock tree. The clock of the register $W_{9\_t}$ of the $i^{th}$ operation stage is transferred from the clock of the register $W_8$ of the $(i+1)^{th}$ operation stage. The clock of the register $W_8$ of the $(i+1)^{th}$ operation stage is transferred from the clock of the register $W_7$ of the $(i+2)^{th}$ operation stage. And so on, the clock of the register $W_2$ of the $(i+7)^{th}$ operation stage is transferred from the clock of the register $W_1$ of the $(i+8)^{th}$ operation stage. The register $W_9$ of the $i^{th}$ operation stage transfers the clock to the register $W_{10}$ of the $(i-1)^{th}$ operation stage. And so on, the register $W_{13}$ of the $(i-4)^{th}$ operation stage transfers the clock to the register $W_{14\_t}$ of the $(i-5)^{th}$ operation stage.

By adding the seventeenth register $W_{9\_t}$ and the eighteenth register $W_{14\_t}$ configured as above, both the forward clock tree and the reverse clock tree may be employed for the pipeline structure, so that the requirement for $T_{hold}$ of the register is met, while the running frequency of the chip is enhanced, and thus the chip performance is improved.

Figure 6:
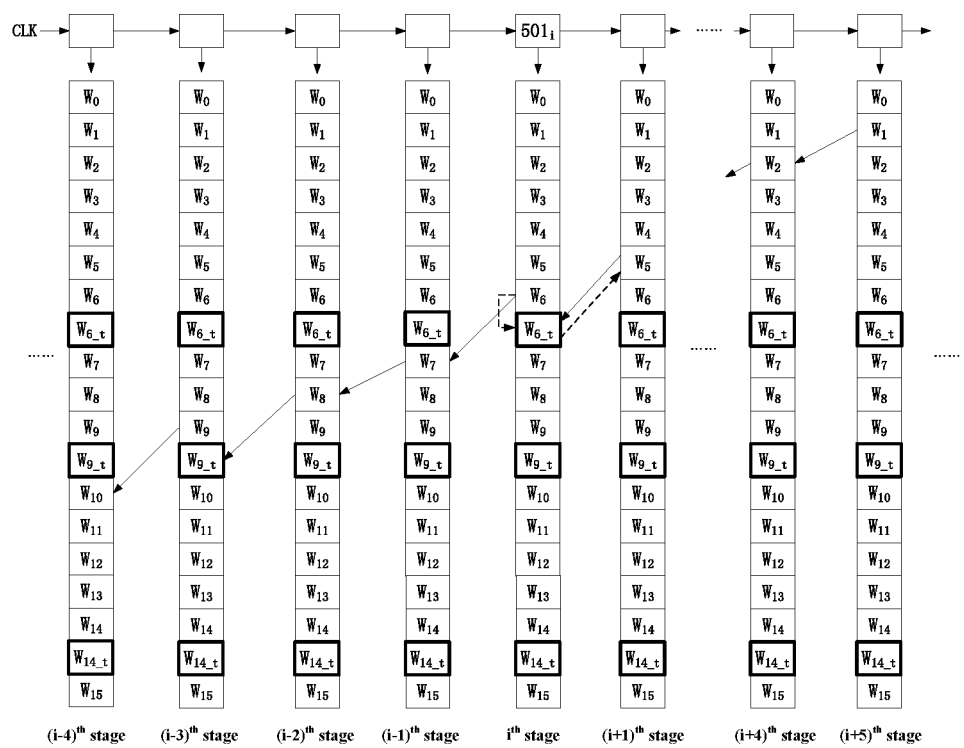
FIG. 6 is a diagram illustrating another hash engine employing the clock tree structure of FIG. 4 according to an embodiment of the present disclosure.

FIG. 6 is a diagram illustrating another hash engine employing the clock tree structure of FIG. 4 according to an embodiment of the present disclosure. It should be noted that the same portions as FIG. 5 will not be repeated herein, and only portions different from FIG. 5 will be described.

Since the reverse clock tree causes the clock reverse delays by $T_{clklatency}$ along each stage, $T_{setup}$ of a register may not be met according to the Equation 9 after passing through a certain number of stages. To this end, as shown in FIG. 6, each operation stages can further comprise a nineteenth register $W_{6\_t}$, which is similar in circuit arrangement to the seventeenth register $W_{9\_t}$ and the eighteenth register $W_{14\_t}$, in addition to the first to sixteenth registers $W_0$ to $W_{15}$ and the seventeenth register $W_{9\_t}$ and the eighteenth register $W_{14\_t}$. That is, the nineteenth register $W_{6\_t}$ of each operation stage has its input end coupled to an output end of the seventh register $W_6$ of the current operation stage, its output end coupled to an input end of a sixth register $W_5$ of the next operation stage, and its clock signal end coupled to an output end of a clock buffer circuit for the register $W_{6\_t}$. The clock buffer circuit for the register $W_{6\_t}$ has its input end coupled to an output end of a clock buffer circuit for the sixth register $W_5$ of the next operation stage. That is, a clock of the register $W_{6\_t}$ is transferred from a clock of the register $W_5$ of the next operation stage.

According to the embodiment shown in FIG. 6, the hash engine overall employs the forward clock tree structure, and locally employs a reverse clock tree structure. In each operation stage, in addition to the clocks of the registers $W_0$, $W_1$, $W_9$, $W_{14}$, $W_{15}$ being coupled to the master clock tree, a clock of $W_6$ is also coupled to the master clock tree. However, a clock of the remaining register $W_k$ ($W_2$ to $W_5$, $W_7$ to $W_8$ and $W_{10}$ to $W_{13}$) is transferred from a clock of $W_{k-1}$ of the next operation stage.

From the perspective of the overall pipeline, the clocks of the registers $W_0$, $W_1$, $W_6$, $W_9$, $W_{14}$, $W_{15}$ of the $i^{th}$ operation stage are coupled to the master clock tree. A clock of the register $W_{6\_t}$ is transferred from a clock of a register $W_5$ of the $(i+1)^{th}$ operation stage. The clock of the register $W_5$ of the $(i+1)^{th}$ operation stage is transferred from a clock of a register $W_4$ of the $(i+2)^{th}$ operation stage. And so on, a clock of a register $W_2$ of the $(i+4)^{th}$ operation stage is transferred from a clock of a register $W_1$ of the $(i+5)^{th}$ operation stage. The register $W_6$ of the $i^{th}$ operation stage transfers the clock to a register $W_7$ of the $(i-1)^{th}$ operation stage. And so on, a register $W_8$ of the $(i-2)^{th}$ operation stage transfers the clock to a register $W_{9\_t}$ of the $(i-3)^{th}$ operation stage. A register $W_9$ of the $(i-3)^{th}$ operation stage transfers the clock to a register $W_{10}$ of the $(i-4)^{th}$ operation stage, and so on.

In the embodiment shown in FIG. 6, since the nineteenth register $W_{6\_t}$ is added, the clock path from $W_1$ to $W_{9\_t}$ is divided into two parts, and the clock path of each part is shortened relative to the whole reverse clock path, so that the requirement for $T_{setup}$ of the register can be met.

It should be understood by those skilled in the art that the specific insertion position of the nineteenth register is not limited to the position shown in FIG. 6, but can be in another position as long as the requirement for $T_{setup}$ of the register can be met. The insertion position of the added register is typically selected to be at a register in the middle of the clock path from $W_1$ to $W_{9\_t}$. For example, insertion of $W_{5\_t}$ between $W_5$ and $W_6$ can be also performed. The circuit arrangement when $W_{5\_t}$ is inserted is similar to that when $W_{6\_t}$ is inserted as described above, which will not be repeated herein.

Figure 7:
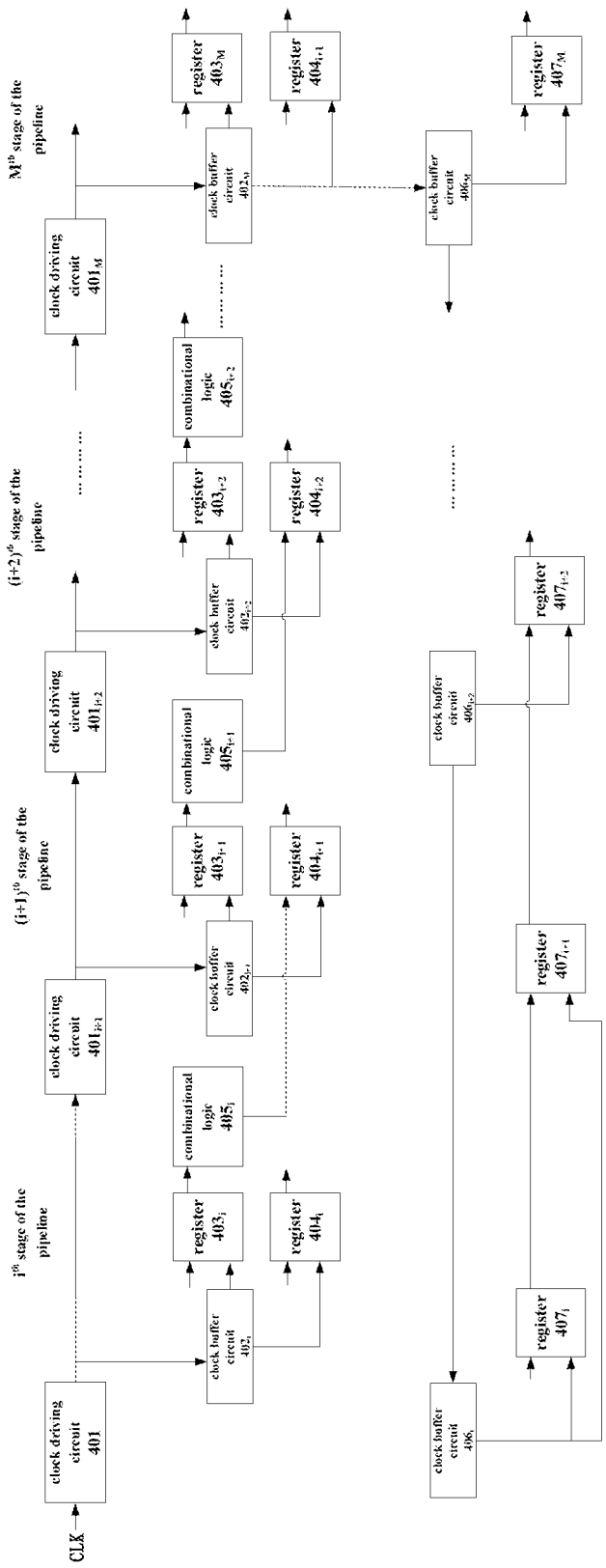
FIG. 7 is a schematic diagram illustrating a clock tree structure according to another embodiment of the present disclosure.

FIG. 7 is a schematic diagram illustrating a clock tree structure according to another embodiment of the present disclosure. The forward clock tree of FIG. 7 is the same as that shown in FIG. 4 and therefore will not be repeated herein. Unlike the portion of the reverse clock tree shown in FIG. 4, in the embodiment of FIG. 7, a clock signal of the third-class register $407_i$ of the $i^{th}$ operation stage is transferred from a clock signal of a corresponding register $407_{i+2}$ of the $(i+2)^{th}$ operation stage, and the clock signal provided to the third-class register $407_i$ of the $i^{th}$ operation stage is also provided to a corresponding third-class register $407_{i+1}$ of the $(i+1)^{th}$ operation stage.

That is, a clock end of the third-class register $407_i$ of the $i^{th}$ operation stage is coupled to an output end of a clock buffer circuit $406_i$, while an input end of the clock buffer circuit $406_i$ is coupled to an output end of a corresponding clock buffer circuit $406_{i+2}$ of the $(i+2)^{th}$ operation stage. The output end of the corresponding clock buffer circuit $406_{i+2}$ is also coupled to a clock end of a corresponding register $407_{i+2}$ of the $(i+2)^{th}$ operation stage. At the same time, the clock end of the corresponding register $407_{i+1}$ of the $(i+1)^{th}$ operation stage is also coupled to the output end of the clock buffer circuit $406_i$.

As described above with reference to FIG. 4, the corresponding registers $407_{i+1}$ of the $(i+1)^{th}$ operation stage and the corresponding registers $407_{i+2}$ of the $(i+2)^{th}$ operation stage refer to the register $407_{i+1}$ of the $(i+1)^{th}$ operation stage and the register $407_{i+2}$ of the $(i+2)^{th}$ operation stage, to which the output signal of the register $407_i$ of the $i^{th}$ operation stage is transferred. Taking the SHA-256 as an example, for example, output of the register $W_5$ of the $i^{th}$ operation stage is transferred to a register $W_4$ of the $(i+1)^{th}$ operation stage, and output of the register $W_4$ of the $(i+1)^{th}$ operation stage is transferred to a register $W_3$ of the $(i+2)^{th}$ operation stage, so that a clock end of the register $W_5$ of the $i^{th}$ operation stage is coupled to an output end of its corresponding clock buffer circuit $406_i$, and a clock end of the register $W_4$ of the $(i+1)^{th}$ operation stage is also coupled to the output end of the clock buffer circuit $406_i$, while an input end of the clock buffer circuit $406_i$ is coupled to an output end of a clock buffer circuit $406_{i+2}$ of the $(i+2)^{th}$ operation stage used for providing a clock signal to the register $W_3$.

That is, an input end of a clock buffer circuit providing the clock signal to a register $W_k$ of the $i^{th}$ operation stage is coupled to an output end of a clock buffer circuit of the $(i+2)^{th}$ operation stage used for providing the clock signal to a register $W_{k-2}$, and so on until the $M^{th}$ operation stage, at which an input end of a clock buffer circuit $406_M$ providing the clock signal to a third-class register $407_M$ is coupled to an output end of a clock buffer circuit $402_M$ providing the clock signal to a first-class register $403_M$ and a second-class register $404_M$ of the $M^{th}$ operation stage.

For example, taking the SHA-256 as an example, an input end of a clock buffer circuit providing the clock signal to a register $W_3$ of the $(M-2)^{th}$ operation stage should be coupled to an output end of a clock buffer circuit of the $M^{th}$ operation stage used for providing the clock signal to a register $W_1$ and $W_1$ belongs to the first-class register, that is, an input end of the clock buffer circuit $402_M$ of the $M^{th}$ operation stage used for providing the clock signal to a register $W_1$ is coupled to an output end of a clock driving circuit $401_M$, so that at the $M^{th}$ operation stage, output of the clock buffer circuit $402_M$ providing the clock signal to the register $W_1$ after passing through the clock buffer circuit $406_M$ again, is input to the clock buffer circuit of the $(M-2)^{th}$ operation stage providing the clock signal to the register $W_3$. This will be described in detail with reference to FIG. 8.

Likewise, the clock module in the embodiment overall employs the forward clock tree structure, so that the running frequency of the chip can be improved, and thus the chip performance can be improved. At the same time, since the third-class register which does not participate in the combinational logical operation employs the reverse clock tree, the requirement for $T_{hold}$ can be met.

An application example of the clock tree structure of FIG. 7 is described below in conjunction with the circuit structure of SHA-256.

Figure 8:
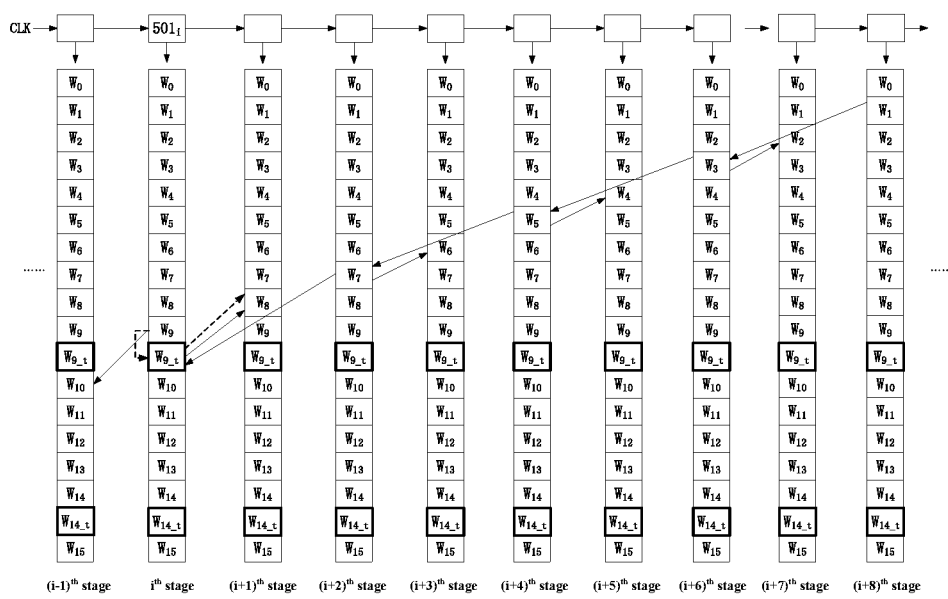
FIG. 8 is a diagram illustrating a hash engine employing the clock tree structure of FIG. 7 according to an embodiment of the present disclosure.

FIG. 8 is a diagram illustrating a hash engine employing the clock tree structure of FIG. 7 according to an embodiment of the present disclosure. Likewise, a solid arrow in FIG. 8 indicates a delivery direction of the clock signal, and a dotted arrow indicates a delivery direction of the data. Further, for simplicity, FIG. 8 shows only data transfer and clock transfer of some of registers in each operation stage, and data transfer and clock transfer of other registers are omitted. According to the disclosure of FIG. 8, data transfer and clock transfer of each register in each operation stage will be readily contemplated by those skilled in the art. As for the same portions as FIGS. 5 and 6, description thereof will be omitted.

As shown in FIG. 8, the hash engine comprises a plurality of operation stages, each of which comprises a plurality of registers $W_0$ to $W_{15}$. Further, similar to the embodiment of FIG. 5, each operation stage further comprises a seventeenth register $W_{9\_t}$ and an eighteenth register $W_{14\_t}$. These registers are driven by the corresponding clock driving circuit 501. The configuration of the eighteenth register $W_{14\_t}$ is the same as that of FIG. 5. The configuration of the seventeenth register $W_{9\_t}$ is different from that of FIG. 5.

According to the embodiment shown in FIG. 8, the hash engine overall employs a forward clock tree structure, and locally employs a reverse clock tree structure. As mentioned above, clocks of the registers $W_0$, $W_1$, $W_9$, $W_{14}$ and $W_{15}$ of each operation stage is coupled to the master clock tree, clock transfer from the register $W_9$ to the register $W_{14\_t}$ is the same as that of FIG. 5, a clock of a $k^{th}$ register $W_{k-1}$ ($W_3$, $W_5$ and $W_7$) is transferred from a clock of a register $W_{k-3}$ of the operation stage after next, and a clock of the register $W_{k-2}$ ($W_2$, $W_4$ and $W_6$) is the same as that of a register $W_{k-1}$ of the previous operation stage. k is an even number and $3 \leq k \leq 8$. A clock of a register $W_8$ is the same as that of a register $W_{9\_t}$ of the previous operation stage.

From the perspective of the overall pipeline, the register $W_{9\_t}$ of the $i^{th}$ operation stage has its input end coupled to an output end of the register $W_9$, its output coupled to an input end of a ninth register $W_8$ of the next operation stage, and its clock signal end coupled to an output end of a clock buffer circuit for the seventeenth register. An input end of the clock buffer circuit for the seventeenth register $W_{9\_t}$ is coupled to an output end of a clock buffer circuit for an eighth register $W_7$ of the $(i+2)^{th}$ operation stage. That is, a clock signal of the register $W_{9\_t}$ of the $i^{th}$ operation stage is transferred from a clock of a register $W_7$ of the $(i+2)^{th}$ operation stage. The clock of the register $W_7$ of the $(i+2)^{th}$ operation stage is transferred from a clock of a register $W_5$ of the $(i+4)^{th}$ operation stage. And so on, a clock of a register $W_3$ of the $(i+6)^{th}$ operation stage is transferred from a clock of a register $W_1$ of the $(i+8)^{th}$ operation stage.

At the same time, a clock end of a register $W_8$ of the $(i+1)^{th}$ operation stage is also coupled to an output end of a clock buffer circuit for the seventeenth register $W_{9\_r}$ of the $i^{th}$ operation stage. That is, a clock of the register $W_8$ of the $(i+1)^{th}$ operation stage is the same as the clock of the register $W_{9\_r}$ of the $i^{th}$ operation stage. A clock of a register $W_6$ of the $(i+3)^{th}$ operation stage is the same as the clock of the register $W_7$ of the $(i+2)^{th}$ operation stage. And so on, a clock of a register $W_2$ of the $(i+7)^{th}$ operation stage is the same as the clock of the register $W_3$ of the $(i+6)^{th}$ operation stage.

The embodiment of FIG. 8 can also meet the requirement for $T_{setup}$ of the register due to nearly half reduction in the number of stages of the reverse clock path from $W_1$ to $W_{9\_r}$, while meeting the requirement for $T_{hold}$ of the register. Compared to the embodiment of FIG. 6, the embodiment of FIG. 8 does not need to insert one additional stage of register, so that the number of registers can be further reduced.

In embodiments according to the present disclosure, the aforementioned registers can include edge triggered registers, such as rising edge triggered registers and/or falling edge triggered registers. The register can comprise a D flip-flop (DFF) and/or latch, wherein the latch can, for example, be a latch employing a pulse-type clock signal.

According to an embodiment of the present disclosure, each stage clock driving circuit among the aforementioned multi-stage clock driving circuits can comprise an odd number of inverters. For example, each stage clock driving circuit can comprise one inverter.

According to an embodiment of the present disclosure, the clock buffer circuit for registers employing the forward clock tree comprises two clock buffers, while the clock buffer circuit for registers employing the reverse clock tree comprises one clock buffer.

It will be appreciated by those skilled in the art that although the concepts of the present disclosure have been described above in conjunction with one circuit structure of the SHA-256, the circuit structure is not intended to constitute any limitation of the concepts of the present disclosure. The concepts of the present disclosure can be applied to any known version of SHA-256 and variations and modifications thereof. The concepts of the present disclosure can even be applied to any computing circuit having the pipeline structure and comprising the time sequential devices.

According to embodiments of the present disclosure, the hash engine as described above can be implemented as a computing chip.

Those skilled in the art will appreciate that the circuit and/or chip according to the present disclosure can be implemented by using a Hardware Description Language (HDL) such as Verilog or VHDL. The HDL description can be synthesized for a cell library designed for a given integrated circuit manufacturing technology and can be modified for timing, power, and other reasons to obtain a final design database, and the final design database can be transmitted to a factory for the production of an integrated circuit by a semiconductor manufacturing system. The semiconductor manufacturing system may produce the integrated circuit by depositing semiconductor material, e.g., on a wafer, which can include a mask, removing material, changing the shape of the deposited material, modifying the material (e.g., modifying a dielectric constant by doping the material or using ultraviolet processing), and so forth. The integrated circuit can include transistors and can also include other circuit elements (e.g., passive elements such as capacitors, resistors, inductors, etc.) and interconnections between the transistors and the circuit elements.

According to embodiments of the present disclosure, the computing chip as described above can be comprised in a hash board. Specifically, the hash board can include one or more computing chips. Multiple computing chips can perform computing tasks in parallel.

According to embodiments of the present disclosure, the hash board as described above can be comprised in a computing device, which is preferably used for performing cryptocurrency mining. For example, the computing device can be a Bitcoin mining machine. Specifically, the cryptocurrency mining machine can include one or more hash boards. Multiple hash boards can perform computing tasks in parallel, such as executing the SHA-256 algorithm.

In all examples shown and discussed herein, any specific value should be construed as exemplary only and not as limiting. Thus, other examples of the exemplary embodiments can have different values.

It will be further understood that a term "comprise/include", when used herein, specify the presence of stated features, entirety, steps, operations, units, and/or components, but do not preclude the presence or addition of one or more other features, entirety, steps, operations, units, components, and/or combinations thereof.

While some specific embodiments of the present disclosure have been shown in detail by way of examples, it should be understood by those skilled in the art that the above examples are intended to be illustrative only and do not limit the scope of the present disclosure. It should be appreciated by those skilled in the art that the above embodiments can be modified without departing from the scope and essence of the present disclosure. The scope of the present disclosure is defined by the attached claims.

What is claimed is:

1. A hash engine, comprising:
an input module, configured to receive a data block;
an operation module, configured to perform a hash operation on the received data block, the operation module comprising a plurality of operation stages arranged in a pipeline structure such that a digital signal based on the data block is sequentially delivered along the plurality of operation stages, each operation stage among the plurality of operation stages comprising a plurality of registers and a combinational logic module, wherein in each current operation stage, output ends of a first set of registers among the plurality of registers are at least coupled to an input end of the combinational logic module of the current operation stage, and input ends of a second set of registers among the plurality of registers are coupled to an output end of a combinational logic module of a previous operation stage; and
a clock module, configured to provide a clock signal to each of the plurality of operation stages, the clock module comprising multi-stage clock driving circuits such that the clock signal from a clock source is sequentially delivered along the multi-stage clock driving circuits, wherein for the first and second sets of registers of the plurality of operation stages, a delivery direction of the digital signal is the same as that of the clock signal.

2. The hash engine according to claim 1, wherein in each current operation stage, a third set of registers among the plurality of registers each has its input end coupled to an output end of a corresponding register in the previous operation stage, and its output end coupled to an input end of a corresponding register in a next operation stage, wherein for the third set of registers of the plurality of operation stages, a delivery direction of the digital signal is opposite to that of the clock signal.

3. The hash engine according to claim 2, wherein the clock module further comprises a clock buffer circuit for each register among the plurality of registers, a clock signal end of each register being coupled to an output end of the clock buffer circuit for each register, and wherein an input end of a clock buffer circuit for each register among the first and second sets of registers of each current operation stage is coupled to an output end of a clock driving circuit for the current operation stage.

4. The hash engine according to claim 3, wherein the plurality of registers of each current operation stage further comprise one or more additional registers, one of the one or more additional registers having its input end coupled to an output end of a specific register among the first set of registers of the current operation stage, its output end coupled to an input end of a register of the next operation stage corresponding to the specific register, and its clock signal end coupled to an output end of a clock buffer circuit for the one additional register.

5. The hash engine according to claim 4, wherein the hash engine is used for performing a SHA-256 algorithm, the plurality of registers of each current operation stage includes at least first to sixteenth registers ($W_0 \ldots W_{15}$), the first set of registers includes first, second, tenth and fifteenth registers ($W_0$, $W_1$, $W_9$, $W_{14}$), and the second set of registers includes a sixteenth register ($W_{15}$), the one or more additional registers include a seventeenth register ($W_{9\_t}$) and an eighteenth register ($W_{14\_t}$), wherein:

the seventeenth register ($W_{9\_t}$) has its input end coupled to an output end of the tenth register ($W_9$) of the current operation stage, its output end coupled to an input end of a ninth register ($W_8$) of the next operation stage, and its clock signal end coupled to an output end of a clock buffer circuit for the seventeenth register, and the eighteenth register ($W_{14\_t}$) has its input end coupled to an output end of the fifteenth register ($W_{14}$) of the current operation stage, its output end coupled to an input end of a fourteenth register ($W_{13}$) of the next operation stage, and its clock signal end coupled to an output end of a clock buffer circuit for the eighteenth register.

6. The hash engine according to claim 5, wherein the third set of registers includes third to ninth registers ($W_2 \ldots W_8$) and eleventh to fourteenth registers ($W_{10} \ldots W_{13}$).

7. The hash engine according to claim 6, wherein for the third to ninth registers ($W_2 \ldots W_8$) of each operation stage, an input end of a clock buffer circuit for a $k^{th}$ register ($W_{k-1}$) is coupled to an output end of a clock buffer circuit for a $(k-1)^{th}$ register ($W_{k-2}$) of the next operation stage, where k is an integer and $3 \leq k \leq 9$, and wherein an input end of the clock buffer circuit for the seventeenth register ($W_{9\_t}$) is coupled to an output end of a clock buffer circuit for the ninth register ($W_8$) of the next operation stage.

8. The hash engine according to claim 6, wherein for the third to eighth registers ($W_2 \ldots W_7$) of each operation stage, an input end of a clock buffer circuit for a $k^{th}$ register ($W_{k-1}$) is coupled to an output end of a clock buffer circuit for a $(k-2)^{th}$ register ($W_{k-3}$) of an operation stage after next, a clock signal end of a $(k-1)^{th}$ register ($W_{k-2}$) of each operation stage is coupled to an output end of a clock buffer circuit for a $k^{th}$ register ($W_{k-1}$) of the previous operation stage, where k is an even number and $3 \leq k \leq 8$, an input end of the clock buffer circuit for the seventeenth register ($W_{9\_t}$) is coupled to an output end of a clock buffer circuit for an eighth register ($W_7$) of an operation stage after next, and wherein a clock signal end of a ninth register ($W_8$) of each operation stage is coupled to an output end of a clock buffer circuit for a seventeenth register ($W_{9\_t}$) of the previous operation stage.

9. The hash engine according to claim 6, wherein for the eleventh to fourteenth registers ($W_{10} \ldots W_{13}$) of each operation stage, an input end of a clock buffer circuit for a $j^{th}$ register ($W_{j-1}$) is coupled to an output end of a clock buffer circuit for a $(j-1)^{th}$ register ($W_{j-2}$) of the next operation stage, where j is an integer and $11 \leq j \leq 14$, and wherein an input end of the clock buffer circuit for the eighteenth register ($W_{14\_t}$) is coupled to an output end of a clock buffer circuit for a fourteenth register ($W_{13}$) of the next operation stage.

10. The hash engine according to claim 5, wherein the third set of registers includes third to sixth registers ($W_2 \ldots W_5$), eighth to ninth registers ($W_7$, $W_8$), and eleventh to fourteenth registers ($W_{10} \ldots W_{13}$), the one or more additional registers further include a nineteenth register ($W_{6\_t}$) having its input end coupled to an output end of the seventh register ($W_6$) of the current operation stage, its output end coupled an input end of a sixth register ($W_8$) of the next operation stage, and its clock signal end coupled to an output end of a clock buffer circuit for the nineteenth register, the clock buffer circuit for the nineteenth register ($W_{6\_t}$) having its input end coupled to an output end of a clock buffer circuit for a sixth register ($W_8$) of the next operation stage, an input end of a clock buffer circuit of a seventh register ($W_6$) for each current operation stage is coupled to an output end of a clock driving circuit for the current operation stage, and wherein for the third to sixth registers ($W_2 \ldots W_8$) and the eighth to ninth registers ($W_7$, $W_8$) of each current operation stage, an input end of a clock buffer circuit for a $k^{th}$ register ($W_{k-1}$) is coupled to an output end of a clock buffer circuit for a $(k-1)^{th}$ register ($W_{k-2}$) of the next operation stage, where k is an integer and $3 \leq k \leq 6$ or $8 \leq k \leq 9$.

11. The hash engine according to claim 5, wherein the third set of registers includes third to fifth registers ($W_2 \ldots W_4$), seventh to ninth registers ($W_6 \ldots W_8$), and eleventh to fourteenth registers ($W_{10} \ldots W_{13}$), the one or more additional registers further include a twentieth register ($W_{5\_t}$) having its input end coupled to an output end of a sixth register ($W_8$) of the current operation stage, its output end coupled to an input end of a fifth register ($W_4$) of the next operation stage, and its clock signal end coupled to an output end of a clock buffer circuit for the twentieth register, the clock buffer circuit for the twentieth register ($W_{5\_t}$) having its input end coupled to an output end of a clock buffer circuit for the fifth register ($W_4$) of the next operation stage, an input end of a clock buffer circuit of a sixth register ($W_8$) for each current operation stage is coupled to an output end of a clock driving circuit for the current operation stage, and wherein for the third to fifth registers ($W_2 \ldots W_4$) and the seventh to ninth registers ($W_6 \ldots W_8$) of each operation stage, an input end of a clock buffer circuit for a $k^{th}$ register ($W_{k-1}$) is coupled to an output end of a clock buffer circuit for a $(k-1)^{th}$ register ($W_{k-2}$) of the next operation stage, where k is an integer and $3 \leq k \leq 5$ or $7 \leq k \leq 9$.

12. The hash engine according to claim 3, wherein each stage clock driving circuit among the multi-stage clock driving circuits comprises an odd number of inverters.

13. The hash engine according to claim 3, wherein a clock buffer circuit for each register among the first and second sets of registers comprises two clock buffers, and a clock buffer circuit for each register among the third set of registers comprises one clock buffer.

14. A hash board comprising one or more computing chips each of which comprises one or more hash engines according to claim 1.

15. A clock tree circuit, comprising:
a clock source, configured to provide a basic clock signal; and
multi-stage clock driving circuits, wherein the basic clock signal from the clock source is sequentially delivered along the multi-stage clock driving circuits, each stage clock driving circuit among the multi-stage clock driving circuits being configured to provide a clock signal for each of a plurality of operation stages,
wherein the plurality of operation stages are arranged in a pipeline structure such that a digital signal based on a received data block is sequentially delivered along the plurality of operation stages, each operation stage among the plurality of operation stages comprising a plurality of registers and a combinational logic module, wherein in each current operation stage, a first set of registers among the plurality of registers has their output ends at least coupled to an input end of the combinational logic module of the current operation stage, a second set of registers among the plurality of registers has their input ends coupled to an output end of a combinational logic module of the previous operation stage, and a third set of registers among the plurality of registers has their respective input ends coupled to respective output ends of respective corresponding registers in the previous operation stage, and their respective output ends coupled to respective input ends of respective corresponding registers in a next operation stage,
wherein for the first and second sets of registers of the plurality of operation stages, a delivery direction of the digital signal is the same as that of the clock signal, and
wherein for the third set of registers of the plurality of operation stages, a delivery direction of the digital signal is opposite to that of the clock signal.

* * * * *